US012600582B2

(12) United States Patent
Narendra et al.

(10) Patent No.: US 12,600,582 B2
(45) Date of Patent: Apr. 14, 2026

(54) SYSTEMS AND METHODS FOR OPTIMIZED CONTAINER LOADING OPERATIONS

(71) Applicant: ZEBRA TECHNOLOGIES CORPORATION, Lincolnshire, IL (US)

(72) Inventors: Patrenahalli M. Narendra, Hoffman Estates, IL (US); Miroslav Trajkovic, Setauket, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 932 days.

(21) Appl. No.: 17/739,961

(22) Filed: May 9, 2022

(65) Prior Publication Data

US 2023/0356966 A1 Nov. 9, 2023

(51) Int. Cl.
*G06F 7/00* (2006.01)
*B65G 43/08* (2006.01)
*B65G 67/04* (2006.01)

(52) U.S. Cl.
CPC ............. *B65G 67/04* (2013.01); *B65G 43/08* (2013.01); *B65G 2203/0216* (2013.01); *B65G 2203/0233* (2013.01); *B65G 2203/041* (2013.01)

(58) Field of Classification Search
CPC ................... B65G 67/04; B65G 43/08; B65G 2203/0216; B65G 2203/0233; B65G 2203/041; B65G 2209/04; B65G 1/137; B65G 1/00; B65G 47/00; B65G 49/05; B65G 57/00; B65G 59/00; B65G 61/00; B65G 65/00; B65G 67/00; B65G 2201/02; B65G 1/1373; B65G 1/1378;

B65G 57/02; B65G 57/03; B65G 57/20; B65G 57/22; B65G 57/24; B65G 2203/02; B65G 2203/0266; B65G 2203/042; B65G 2203/044; B65G 67/02; B65G 2017/0048; B65G 2017/0051; B65G 2201/0267;

(Continued)

(56) References Cited

U.S. PATENT DOCUMENTS 10,148,918 B1 * 12/2018 Seiger ................ G06Q 10/0833
2021/0276807 A1 * 9/2021 van Schijndel ...... B65G 1/1375

(Continued)

FOREIGN PATENT DOCUMENTS

CA 3046663 A1 * 7/2018 ........... B65G 1/0492
JP 7072959 B2 * 5/2022 ............. G06Q 10/08

*Primary Examiner* — Yolanda R Cumbess

(57) ABSTRACT

A method includes: receiving, for items in a staging area, item identifiers and staged locations in facility coordinates, as detected via a sensor; obtaining a load configuration including a load sequence defining an order for loading the items into a container, and a load location within the container for each item, in container coordinates; according to the load sequence, for each item: retrieving the corresponding staged location (in facility coordinates) and load location (in container coordinates); providing loading guidance including the retrieved staged location and the retrieved load location, for rendering of the loading guidance in one of the facility coordinate system and the container coordinate system; and responsive to placement of the item in the container, receiving and storing an actual load location, in the container coordinate system; and during an unloading operation, presenting unloading guidance including the actual load locations of the items.

20 Claims, 6 Drawing Sheets

(58) Field of Classification Search
CPC .... G06Q 10/08; G06Q 10/083; G06Q 10/087;
G06Q 10/06
USPC ................................. 700/213–217, 225–226
See application file for complete search history.

(56) References Cited

U.S. PATENT DOCUMENTS

2022/0122031 A1*   4/2022   Powers ................... B65B 57/00
2023/0214951 A1*   7/2023   Grob .................... G06Q 10/043
705/7.39

* cited by examiner

Device 124                                    Server 148

205
Initiate pose tracking

↓

210
Capture, send IDs & locations    ┈┈┈┈→    215
                                          Receive IDs & locations

↓

Unload seq.,                 →    220
dimensions                        Obtain load configuration

↓

225
                                          Select next item

↓

235                          ←┈┈┈┈    230
Present staged location                   Retrieve item locations, send
                                          load command

↓                                         ↓

240
Detect vehicle feature(s),
register to vehicle coordinates

↓

245
Present load location

↓

250                          ┈┈┈┈→    255          Yes
Capture, send loaded location             Items remain?

↓ No

200                 260
                                          Send unload command(s)

FIG. 2

SYSTEMS AND METHODS FOR OPTIMIZED CONTAINER LOADING OPERATIONS

BACKGROUND

Transportation and delivery of items, e.g., the transportation and delivery of packages to specified destinations, typically involves loading the items into a container for transportation, such as a vehicle (e.g., a delivery van or the like). The process by which the items are loaded into the vehicle, however, may lead to the items being insufficiently accessible during actual delivery operations.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 2 is a flowchart of a method for optimized container loading operations.

Figure 1:
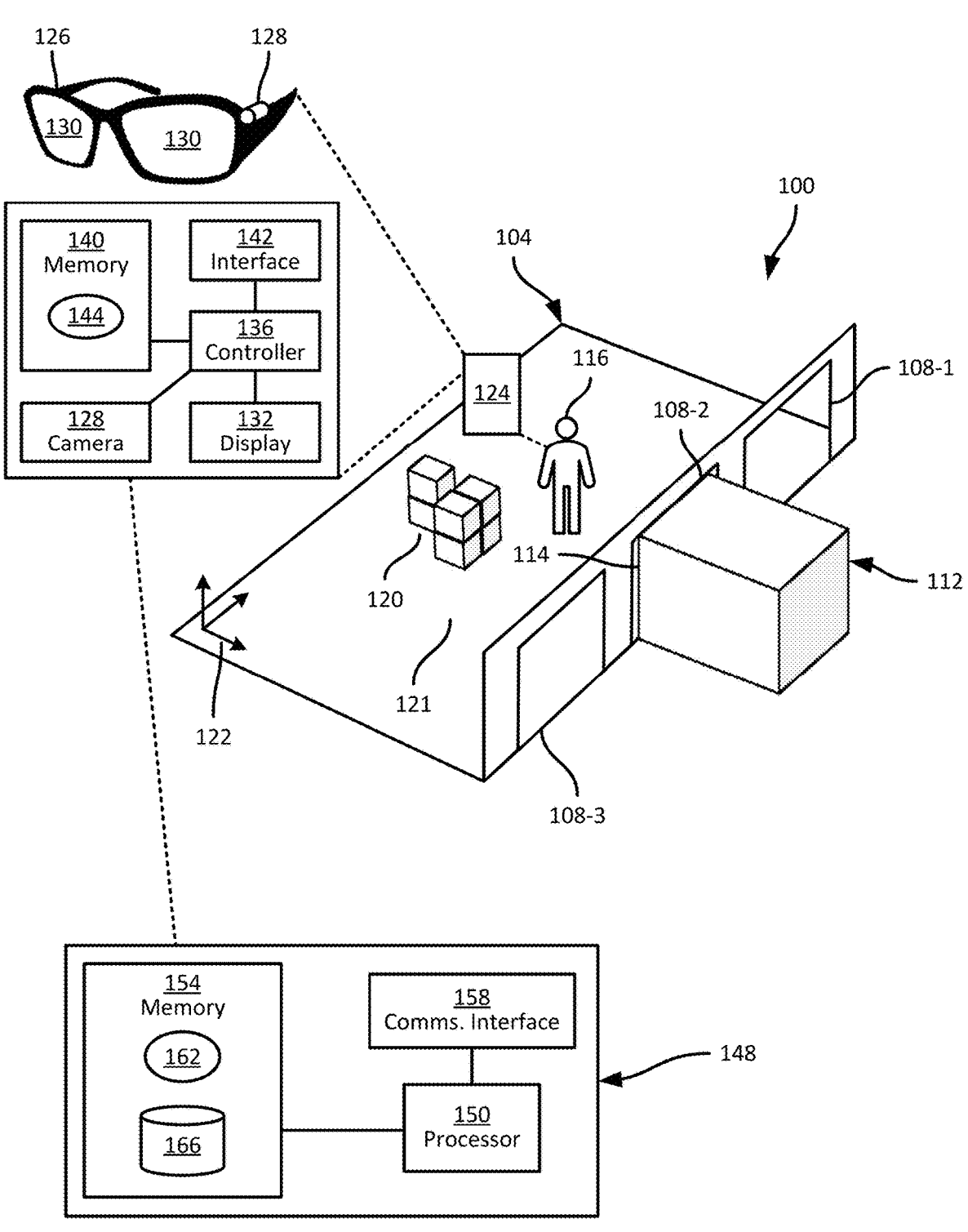
FIG. 1 is a diagram of a facility.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method, comprising: receiving, for a plurality of items in a staging area, respective item identifiers and staged locations in a facility coordinate system, the item identifiers and staged locations detected via a sensor; obtaining a load configuration including (i) a load sequence defining an order in which the items in the staging area are to be loaded into a container, and (ii) a load location within the container for each of the items, in a container coordinate system; according to the load sequence, for each item: retrieving the corresponding staged location, in the facility coordinate system, and the corresponding load location, in the container coordinate system; presenting providing loading guidance including (i) the retrieved staged location in the facility coordinate system and (ii) the retrieved load location in the container coordinate system, for rendering of the loading guidance in one of the facility coordinate system and the container coordinate system; and responsive to placement of the item in the container, receiving and storing an actual load location, in the container coordinate system; and during an unloading operation, presenting unloading guidance including the actual load locations of the items.

Additional examples disclosed herein are directed to a computing device, comprising: a memory; and a controller configured to: receive, for a plurality of items in a staging area, respective item identifiers and staged locations in a facility coordinate system, the item identifiers and staged locations detected via a sensor; obtain a load configuration including (i) a load sequence defining an order in which the items in the staging area are to be loaded into a container, and (ii) a load location within the container for each of the items, in a container coordinate system; according to the load sequence, for each item: retrieve the corresponding staged location, in the facility coordinate system, and the corresponding load location, in the container coordinate system; provide loading guidance including (i) the retrieved staged location in the facility coordinate system and (ii) the retrieved load location in the container coordinate system, for rendering of the loading guidance in one of the facility coordinate system and the container coordinate system; and responsive to placement of the item in the container, receive and store an actual load location, in the container coordinate system; and during an unloading operation, present unloading guidance including the actual load locations of the items.

FIG. 1 depicts a container loading and unloading system 100, including a facility 104 (e.g., a warehouse, transit facility such as an airport, or the like, a portion of which is illustrated in FIG. 1) with a set of load bays 108-1, 108-2, and 108-3 (collectively, referred to as load bays 108, and generically referred to as a load bay 108; similar nomenclature may also be used for other components herein). As illustrated, the facility 104 includes a portion of a building, such as a cross dock or portion thereof, including the load bays 108. The load bays 108 may, for example, be arranged along an outer wall of the facility 104, allowing containers, such as a container 112, to approach the load bays 108 from the exterior of the facility 104. In other examples, smaller or greater numbers of load bays 108 may be included. The load bays 108 are illustrated as being dock structures enabling access from within the facility 104 to an exterior of the facility 104 where the container 112 is docked.

Each load bay 108 is configured to accommodate a container, such as the example container 112 shown in FIG. 1, at the load bay 108-2. The container 112 can be any transportable container configured to store packages and/or other types of freight. The container 112 can be, for example, a storage portion of a delivery vehicle such as a van, truck, or the like. That is, the container 112 can be integrated with such a vehicle. In other examples, the container can be a semi-trailer configured for towing by a physically distinct vehicle.

Each load bay 108 includes an opening, e.g., in a wall of the facility 104, that enables staff and/or equipment within the facility 104 to access an interior of the container 112. For example, once the container 112 is placed at the load bay 108-2 as shown in FIG. 1, e.g., with an open end 114 of the container 112 (e.g., a wall with a door or other opening allowing access to an interior of the container 112) substantially flush with the opening of the load bay 108-2, a worker 116 within the facility 104, also referred to as a loader 116, can begin moving items 120 from a staging area 121 of the facility 104 into the container 112.

As noted above, the container 112 can be coupled or integrated with a delivery vehicle. The items 120 can be packages for delivery to various destinations by the delivery vehicle. Generally, once the items 120 have been loaded into the container 112 by the loader 116, an operator of also vehicle (which can be, but is not required to be, the loader 116) drives the vehicle to the above-mentioned destinations in sequence, and at each destination, unloads the relevant item(s) for delivery.

The items 120 are generally loaded into the container 112 by the loader 116 with a view to optimizing the use of spaced within the container 112, e.g., to ensure that the items 120 can all be accommodated in the container 112. However, such a loading process may result in items being arranged within the container 112 in a way that hinders access to such items during delivery. For example, a given item 120 may be placed behind or underneath various other items within the container 112 that are to be delivered later in the above-mentioned sequence than that given item. Delivery of that item may therefore require the operator of the vehicle carrying the container 112 to move various items within the container 112 to search for the relevant item 120. The time taken to complete delivery of all items 120 in the container 112 according to the sequence mentioned earlier, in other words, may be increased as a result of the arrangement in which the items 120 were loaded into the container 112. The loader 116, however, may have little or no access to the delivery sequence during the loading process. In systems in which the loader 116 can view the delivery sequence, attempts to load the items 120 in an arrangement that reduces searching during delivery may simply lead to an increase in time spent loading, e.g., to search for an appropriate item 120, consult the delivery sequence, and the like.

The system 100 therefore includes certain components and functionality to optimize loading operations for the container 112, e.g., to enable the placement of items 120 in the container 112 in an arrangement that facilitates access during delivery, without a corresponding increase in load time and/or complexity by the loader 116. To that end, a facility coordinate system 122 is established within the facility 104, e.g., a three-dimensional coordinate system with an origin at a predefined position in the facility 104.

The system 100 includes a mobile computing device 124 carried by the loader 116. In general, the device 124 is configured to capture data corresponding to the items 120, and to provide load guidance to the loader 116. In the illustrated example, the device 124 is implemented as a wearable computing device, e.g., including a head-mounted display unit with a frame 126 carrying a camera 128 and lenses 130, at least one of which can include an integrated display 132. The camera 128 is oriented to direct a field of view (FOV) thereof in a direction corresponding to the FOV of the loader 116 themselves. As will be apparent, the display 132 can be controlled to overlay information with the FOV of the loader 116. The device 124 can include additional input and output assemblies, such as a microphone, a speaker, and the like (not shown).

The device 124 also includes a controller 136, such as a central processing unit (CPU), graphics processing unit (GPU) or the like, connected with the camera 128 and display 132. The controller is further connected with a non-transitory computer readable medium such as a memory 140. The controller 136 and the memory 140 are implemented as one or more integrated circuits (ICs). The device 124 also includes a communications interface 142 enabling communication between the device 124 and other computing devices, via suitable short-range links, networks, and the like. In some examples, the controller 136, memory 140, and interface 142 can be supported on the frame 126. In other examples, the controller 136, memory 140, and interface 142 can be supported by a housing separate from the frame 126 and carried by the loader 116. The device 124 can also include other sensors in some examples, such as a radio frequency identifier (RFID) reader, a motion sensor such as an inertial measurement unit (IMU), and the like.

The memory 140 stores a plurality of applications executable by the controller 136 to implement various functionality. In particular, in this example the memory 140 stores a loading application 144 whose execution by the controller 136 configures the controller 136 to perform various actions to collect data associated with the items 120, and provide guidance to the loader 116 for placement of the items 120 into the container 112. The functionality implemented via execution of the application 144 can also be implemented via a distinct, special-purpose controller such as a field-programmable gate array (FPGA), application-specific integrated circuit (ASIC), or the like, in other examples.

The system 100 also includes a computing device such as a server 148, in communication with the mobile device 124 via a suitable network (e.g., a local area network in the facility 104, or the like). The server 148 includes a processor 150 (e.g., a CPU, GPU, or the like) interconnected with a memory 154 and a communications interface 158, e.g., each implemented as one or more integrated circuits. The memory 154 stores a load management application 162 for execution by the processor 150 to implement functionality associated with loading of the container 112 and subsequent delivery of the items 120 in the container 112. The memory 154 also stores a repository 166 containing various data corresponding to the items 120, as will be described below.

Turning to FIG. 2, a method 200 of container load operations optimization is shown. The method 200 will be described in conjunction with its performance in the system 100, with certain blocks being performed be the device 124, and other blocks being performed by the server 148. In some examples, as will be apparent in the discussion below, the device 124 can perform some or all of the blocks described as being performed by the server 148.

In general, performance of the method 200 within the system 100 enables the collection and storage, e.g., in the repository 166, of specific locations in the facility 104 of each item 120 intended for loading into the container 112. Based on those locations, delivery sequencing information, and the like, the server 148 (or, as noted above, the device 124 in some embodiments) can determine a load configuration specifying the order in which the items 120 are to be loaded into the container 112, and locations within container 112 in which the items 120 should be placed. The server 148 and the device 124 can then cooperate to provide load guidance to the loader 116, enabling the loader 116 to efficiently place the items 120 into the container 112 according to the load configuration. Performance of the method 200 can further implement the provision of unloading guidance to an operator of the above-mentioned vehicle, e.g., via another client computing device similar to the device 124.

At block 205, the device 124 is configured to initiate pose tracking. Initiation of pose tracking at block 205 occurs in response to execution of the application 144, or another application stored in the memory 140. Pose tracking can involve initiation of a local coordinate system, created by the device 124 arbitrarily (e.g., without a predetermined relationship to the facility coordinate system 122 shown in FIG. 1). The local coordinate system can then be registered to the facility coordinate system 122 according to various mechanisms, such as the imaging of predetermined anchor features in the facility 104, and/or the detection of wireless signals from beacons, access points and the like with predetermined locations in the facility 104. Having registered the local coordinate system to the facility coordinate system 122, the device 124 can then track its current pose (i.e., position and orientation) according to the facility coordinate system 122.

Pose tracking involves capturing a series of images using the camera 128 and tracking the positions of features (e.g., surfaces, edges, corners, and the like) detected in images in the series. The positions of such features throughout the series of images, optionally combined with data from other sensors of the device 124 (e.g., an IMU as mentioned earlier), are used to track movement of the device 124, e.g., in six degrees of freedom. More specifically, the device 124 is configured to generate a sequence of poses of the device 124 in the local coordinate system, which are then transformed into the facility coordinate system 122.

Various mechanisms will occur to those skilled in the art to combine image and/or motion sensor data to generate pose estimations. Examples of such mechanisms include those implemented by the ARCore software development kit provided by Google LLC, and the ARKit software development kit provided by Apple Inc. Pose tracking, once initiated at block 205, continues at the device 124 throughout the remainder of the method 200. The frequency with which new pose estimates are generated by the device 124 varies, for example with the computational resources available to the device 124, the frame rate of the camera 128, and the like. For example, the device 124 may generate pose estimates at a frequency of about 30 Hz, although higher and lower frequencies are also contemplated.

At block 210, the device 124 is configured to capture and send item identifiers and locations for each item 120 in the staging area 121. That is, prior to initiating performance of the method 200, it is assumed that a set of items 120 previously selected for placement into the container 112 (and subsequent delivery) have been placed in the staging area 121. To capture the item identifiers and locations at block 210, the device 124 can be configured to process the images captured for pose tracking. In each image, the device 124 can be configured to identify objects (e.g., associated sets of planes, edges, or the like) with associated machine-readable indicia thereon.

Figure 3:
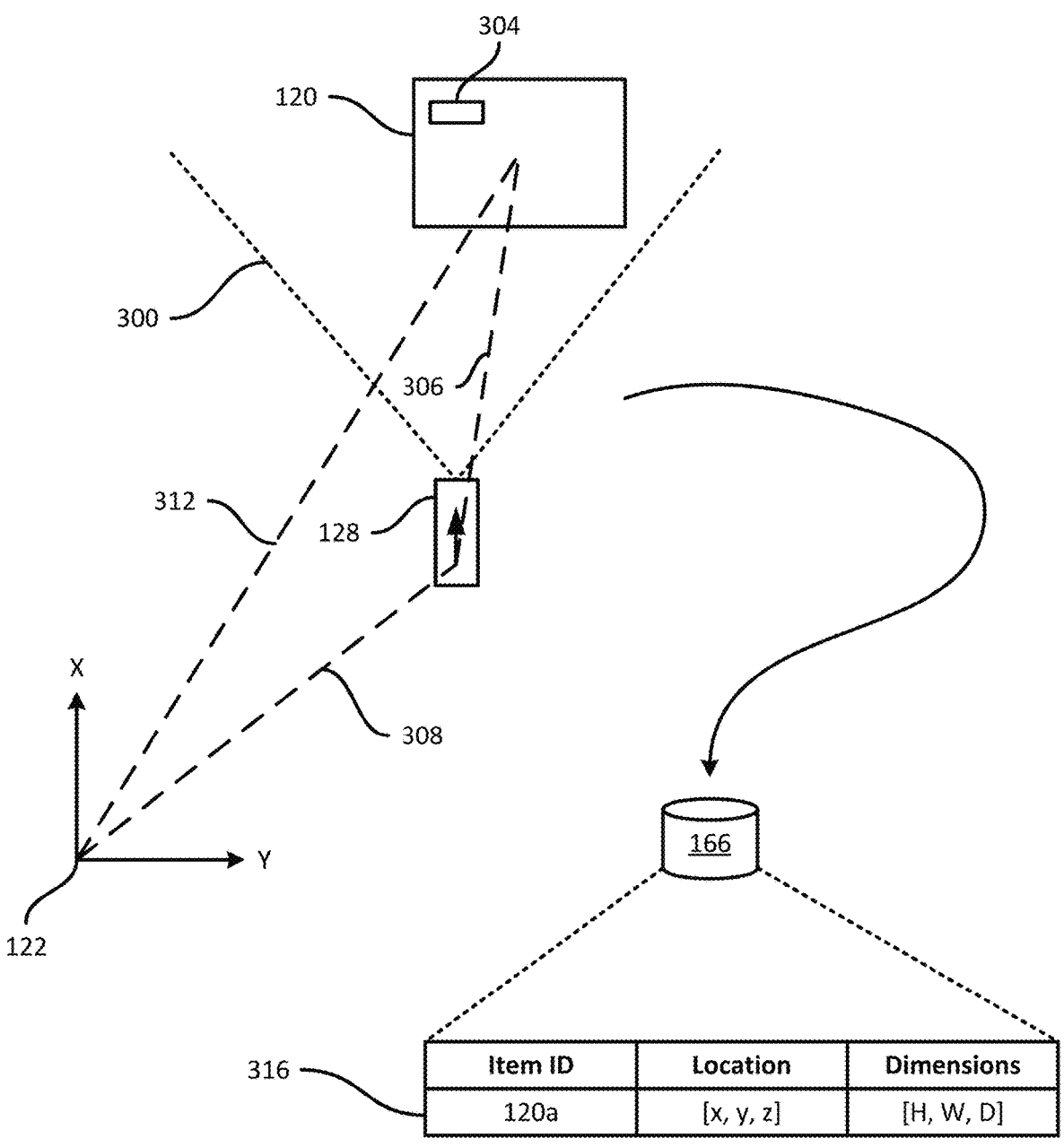
FIG. 3 is a diagram illustrating an example performance of blocks 210 and 215 of the method of FIG. 2.

Turning to FIG. 3, for example, an overhead view of an item 120 and the camera 128 (the remainder of the device 124 is omitted for clarity) is shown. The item 120 is within an FOV 300 of the camera 128, and the device 124 can be configured to detect the positions of visible faces of the item 120. The item 120 bears an identifier, e.g., encoded in a barcode or other machine-readable indicium on a label 304 affixed to the item 120. The device 124 can therefore be configured to determine that the label 304 is positionally associated with the above-mentioned face(s), and to extract an item identifier (e.g., a tracking number, a universal product code, or the like) from the label 304.

Based on the position of the item 120 within the FOV 300 (i.e., the position of the visible faces of the item 120 in one or more images captured by the camera 128), the device 124 can determine a pose 306 of the item 120 relative to the camera 128 itself. Further, as noted above, a current pose 308 of the device 124 relative to the facility coordinate system 122 has been determined. Therefore, the device 124 can be configured to determine a location 312 of the item 120 in the facility coordinate system 122, by combining the pose 306 and the pose 308. The location 312 can be expressed as a single set of three-dimensional coordinates, e.g., representing the estimated centroid of the item 120 (as shown in FIG. 3), or a plurality of coordinate sets, e.g., representing edges and/or corners of the item 120.

Having determined the location of a given item 120, the device 124 is configured to transmit the location and corresponding item identifier to the server 148, for storage in the repository 166. FIG. 3 illustrates an example record 316 in the repository 166, include an item identifier "120*a*", and a numeric representation of the location 312. The record 316 also includes dimensions (e.g., height, width, and depth) for the item 120. The dimensions can be pre-populated in the repository 166 for the corresponding item identifier (e.g., having been previously documented). Alternatively, the device 124 can determine such dimensions from the images captured via pose tracking.

The device 124 can repeat the process above until each item 120 in the staging area 121 has been identified and located. For example, the device 124 can receive a list of expected item identifiers from the server 148 prior to initiating the method 200, and can prompt the loader 116 to continue scanning additional items 120 until each item identifier in the list has been located in the images captured by the camera 128.

At block 215, the server 148 is configured to receive and store the item identifiers and locations, as noted in connection with FIG. 3. As will be apparent, the repository 166 may already contain the item identifiers themselves, and the server 148 therefore need not repeat the storage of item identifiers at block 215. Instead, the server 148 can use the item identifiers as indices to determine which record in the repository 166 to place each received location. In embodiments in which the repository 166 does not contain item dimensions prior to performance of the method 200, the server 148 can also receive and store such dimensions at block 215.

At block 220, the server 148 is configured to obtain a load configuration for the items 120 within the staging area 121. The load configuration specifies a load sequence, defining an order in which the items 120 are to be placed in the container 112. The load configuration also defines a load location within the container 112 for each item 120. As will be discussed further below, the load location is expressed not in the facility coordinate system 122, but in a distinct container coordinate system.

The load configuration can be obtained at block 220 by retrieving the load configuration from the repository 166, in some examples. That is, in some examples the load configuration has been previously generated, whether by the server 148 itself or by another computing device. In other examples, the load configuration is generated by the server 148 at block 220.

The order of placement and locations for the items 120 specified by the load configuration seek to optimize the use of space within the container 112 (e.g., to ensure that the items 120 fit into the container 112), and/or to optimize accessibility of the items 120 during delivery operations. Accessibility of an item is defined by the degree to which that item 120 is occluded by other items (e.g., being placed behind and/or underneath other items) at the time that particular item 120 is to be retrieved from the container 112 for delivery. As will be apparent, minimizing occlusion (i.e., maximizing accessibility) of each item 120 can reduce the time required to deliver the items 120, as retrieval of each item 120 to be delivered involves fewer manipulations of the items 120 in the container 112.

Generation of the load configuration at block 220 can include implementing any suitable optimization process, e.g., based on dynamic programming principles. The inputs to such a process include the item identifiers, and dimensions of the items 120 (which, as noted above, are stored in the repository 166). The inputs to the load configuration generation process also include an unload sequence, indicating the order in which the items 120 are to be removed from the container 112 during delivery. The unload sequence can be obtained from a delivery route, which can be pre-computed based on destination locations associated with the items 120, e.g., to minimize total travel distance and/or time.

Figure 4:
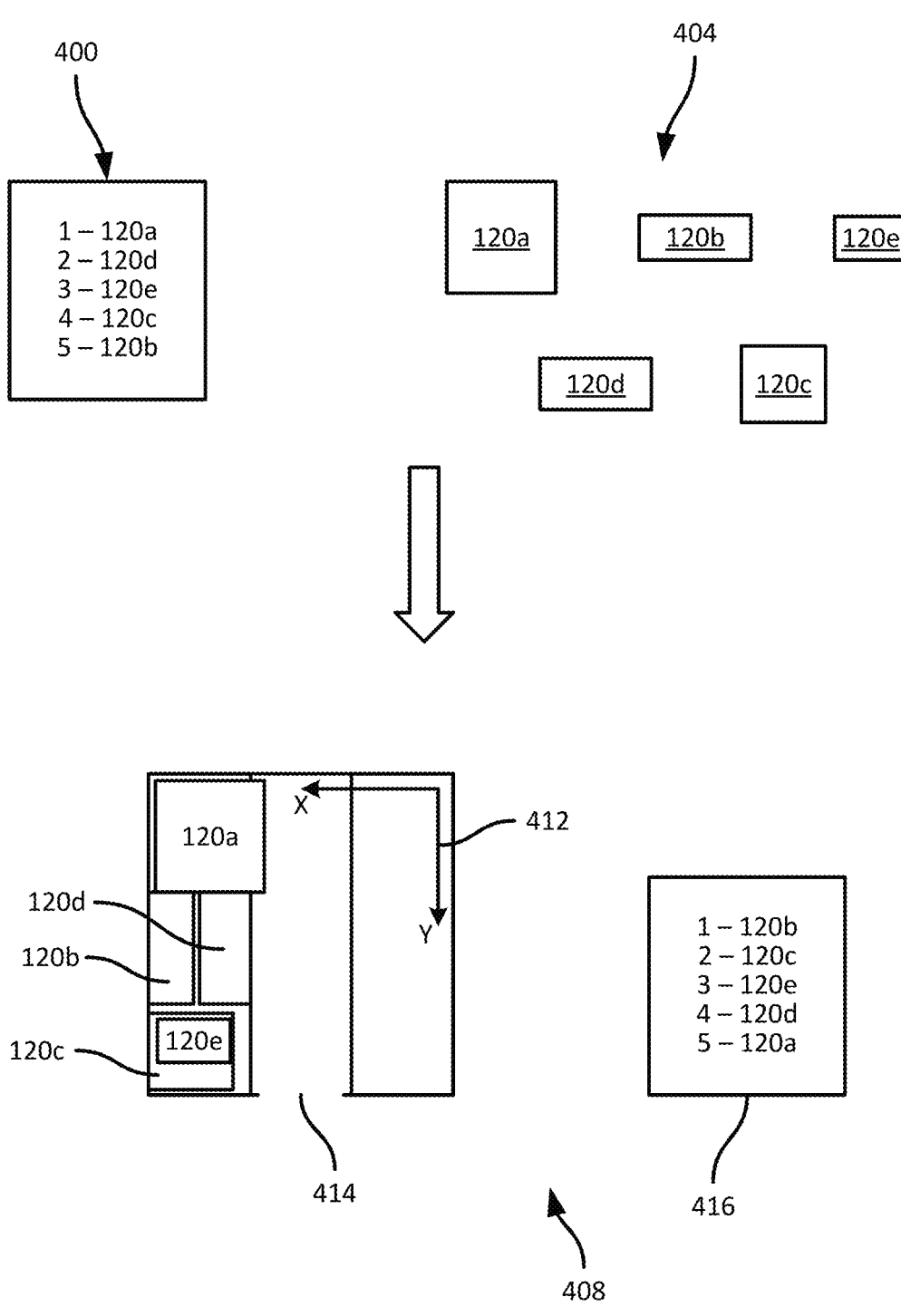
FIG. 4 is a diagram illustrating an example performance of block 220 of the method of FIG. 2.

The above inputs can be processed to select positions in the load sequence for each item 120, and locations in the container 112 for each item 120. Turning to FIG. 4, an example set of inputs and a resulting load configuration are illustrated. Specifically, an unload sequence 400 (derived from a delivery route) indicates an order in which five items 120a, 120b, 120c, 120d, and 120e are to be removed from the container 112 during delivery. Further, dimensions 404 for each of the items listed in the sequence 400 are illustrated graphically. It will be understood that in practice, the dimensions need not be stored or processed graphically, but may instead be stored and processed as numerical values, e.g., representing heights, widths, and depths of each item 120.

To generate a load configuration 408, locations can be selected for each item 120, e.g., in reverse order from the order defined in the unload sequence 400. For example, a location can be selected for the item 120b, followed by the item 120c, and so on. For each item 120, the selected location can be selected to maximize an accessibility function (or minimize an occlusion function). The locations are defined according to a predefined container coordinate system 412, shown in FIG. 4 overlaid on a pair of shelves in the container 112, on either side of a doorway 414 of the container 112. The example load configuration 408 includes a load sequence 416 defining the order in which the items 120 are to be placed in the container 112. In addition, the load configuration specifies locations, in the coordinate system 412, for each item 120. As seen in the illustrated example, certain items (e.g., the items 120b, and 120c) are at least partially occluded by other items. However, the occluding items (the items 120d, and 120e, respectively) are removed from the container 112 earlier during delivery, and when the occluded items 120 are to be removed, they will no longer be occluded.

Returning to FIG. 2, at block 225 the server 148 is configured to begin presenting load guidance, e.g., via the device 124, by selecting an item 120 according to the load sequence 416 of the load configuration 408. In this example, the server 148 selects the first item 120 on the load sequence 416 (that is, the item 120b). At block 230, the server 148 is configured to send a load command to the device 124 containing the staged location of the item 120b (i.e., the location received at block 215, in the facility coordinate system 122), and the load location of the item 120b (as defined in the load configuration 408). In other examples, the above-mentioned locations can be sent in separate transmissions. In further examples, the entire load configuration 408 can be sent to the device 124, which can then present item locations in sequence, as described below.

Figure 5:
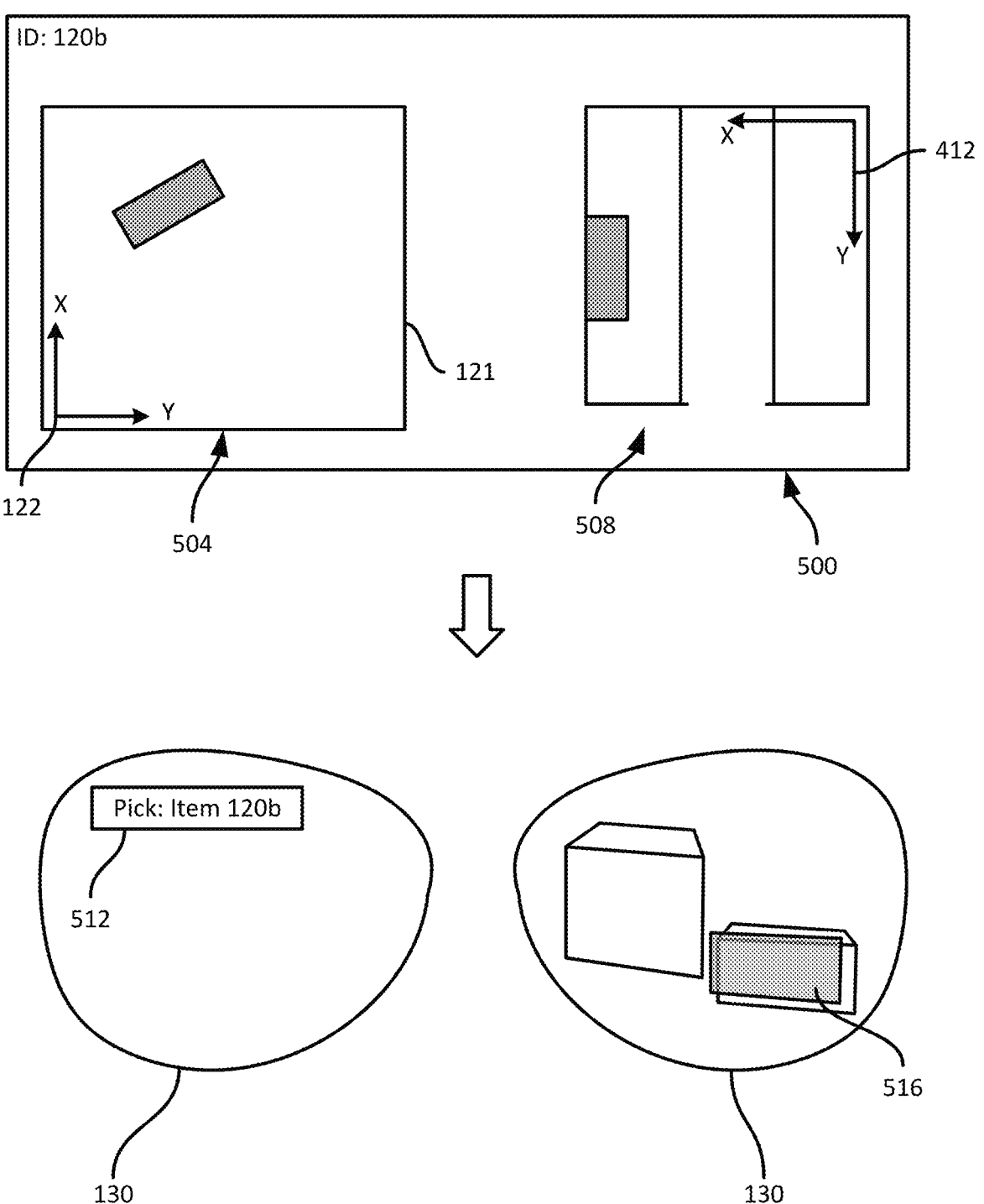
FIG. 5 is a diagram illustrating an example performance of block 235 of the method of FIG. 2.

At block 235, the device 124 is configured to receive the load command mentioned above, and to present the staged location of the item 120b. Turning to FIG. 5, an example load command 500 is illustrated graphically, including the staged location 504 of the item 120b relative to the facility coordinate system 122, and the load location 508 of the item 120b relative to the container coordinate system 412.

In response to receipt of the load command 500, the device 124 is configured to present load guidance to the loader 116, e.g., by rendering one or more overlays via the display(s) 132 integrated with the lenses 130 mentioned in connection with FIG. 1. For example, the device 124 can present a prompt 512 containing the item identifier (the item 120b, in this example). The device 124 can also determine a position of the item 120b relative to the device 124 itself, based on the tracked pose of the device 124 and the staged location 504 (which are both defined in the facility coordinate system 122). Based on that relative position, the device 124 can control the display 132 to render an overlay 516 at the expected location of the item 120b, or any other suitable guidance data. For example, when the expected position of the item 120b relative to the device 124 is outside the FOV of the loader 116, the device 124 can present a directional prompt on the display 132, e.g., an arrow indicating a direction of the expected position.

Following presentation of the staged location by the device 124 at block 235, the loader 116 can retrieve the item 120b, for placement into the container 112. As will be apparent, the overlay 516 (or any other guidance data rendered on the display 132) can be updated periodically, in coordination with the tracked pose of the device 124.

Referring again to FIG. 2, at block 240, the device 124 is configured to detect, e.g., via the camera 128, one or more features of the container 112. As will now be apparent, the tracked poses of the device 124 are defined in the facility coordinate system 122, but the load locations are defined in the container coordinate system 412, which may not have any predefined relationship to the facility coordinate system 122. Thus, while the staged location can be readily employed by the device 124 to guide the loader 116 to retrieve the appropriate item 120, the load location may not be directly usable to guide the loader 116 to place the item 120 in the appropriate location within the container 112.

The device 124 is therefore configured to register the container coordinate system 412 with the facility coordinate system 122, enabling the device to transform the load location from the container coordinate system 412 to the facility coordinate system 122 and render load guidance based on the transformed load location. For example, turning to FIG. 6, an image 600 captured via the pose tracking process initiated at block 205 is shown. The device 124 can be configured to detect features such as upper corners 604 and 608 of the doorway 414. The features can be selected for robust identification under various lighting conditions, at various angles, and the like. Features can be selected prior to performance of the method 200, for example, via any suitable keypoint detection mechanism (e.g., Oriented FAST and Rotated BRIEF, or ORB), and stored in the repository 166 in connection with a container identifier or the like. A wide variety of features other than those shown in FIG. 6 can be employed at block 240. In further examples, the relative positions of other features, such as wireless beacons or the like, can be detected (e.g., based on signal strength from such beacons) at block 240.

The device 124 is configured to detect the relative position of the device 124 itself to the detected container features 604 and 608. Based on the detected relative position and the current pose of the device 124 in the facility coordinate system 122, the device 124 can therefore determine a transform between the facility coordinate system 122 and the container coordinate system 412. With the above-mentioned transform, the device 124 can determine the load location in the facility coordinate system 122.

Figure 6:
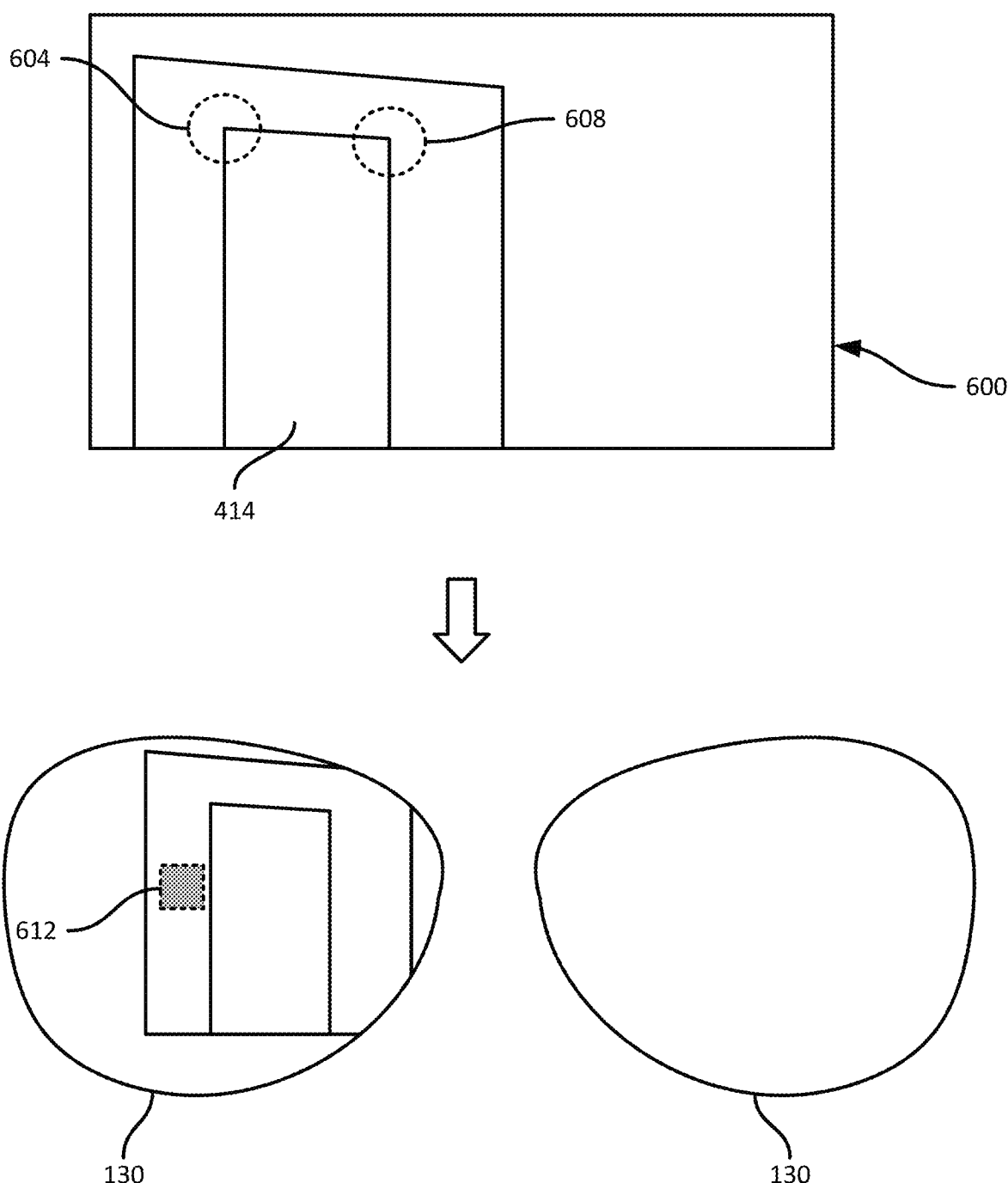
FIG. 6 is a diagram illustrating an example performance of blocks 240 and 245 of the method of FIG. 2.

Having determined the transform as mentioned above, at block 245 the device 124 is configured to present further load guidance, including the load location as specified in the load configuration 408. In particular, as shown in FIG. 6, using the above-mentioned transform from block 240, the device 124 can present an overlay 612 on the display 132, indicating a location in the current FOV of the loader 116 at which the item 120b is to be placed.

Returning to FIG. 2, at block 250 the device 124 can be configured to capture an actual load location for the relevant item (e.g., the item 120b in this example), responsive to placement of the item 120b in the container 112. For example, the device 124 can detect an input, e.g., from the loader 116, indicating that the item 120b has been deposited, and can then process images captured by the camera 128 to detect the item 120b (e.g., using a similar process to that set out in connection with block 210). Based on the position of the item 120b relative to the device 124, the device 124 can determine a location of the item 120b in the facility coordinate system 122. The device 124 is then configured, using the transform mentioned earlier, to determine the actual location of the item 120b within the container 112, according to the container coordinate system 412. As will be apparent, the transform between the container coordinate system 412 and the facility coordinate system 122 is no longer relevant during delivery operations. The above conversion therefore yields an item location that can be employed to provide delivery guidance to the operator of the vehicle transporting the container 112, regardless of the location of the container 112 relative to the facility 104.

At block 250 the device 124 is configured transmit the actual load location, in the container coordinate system 412, to the server 148 for storage in the repository 166. The server 148 is then configured to determine, at block 255, whether there remain items to be loaded according to the load configuration from block 220. When the determination at block 255 is affirmative, the performance of blocks 225 to 250 is repeated. Otherwise, the server 148 can proceed to block 260.

At block 260, the performance of which may be separated from the load operations described above by a period of time (e.g., a number of hours), the server 148 can be configured to provide unloading, or delivery, guidance, using the route and/or unloading sequence mentioned earlier, and the stored actual locations received via successive performances of block 250 as described above.

For example, during delivery of the items 120, the server 148 can receive a request from a client device (e.g., the device 124, or another device with similar features, operated by a driver of the vehicle carrying the container 112) including an item identifier. For example, the client device can present a list of items for delivery, in the order specified by the route mentioned above, and can request unloading guidance from the server 148 for the next item to be unloaded. In response to the request, the server 148 can retrieve the actual load location for the relevant item from the repository 166, and transmit the location to the client device. The client device, in turn, can render an image illustrating the actual load location, e.g., as a static image, or as an overlay generated as described above, e.g., in embodiments in which the client device can track its pose within the container 112, relative to the container coordinate system 412.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:

receiving, for a plurality of items in a staging area, respective item identifiers and staged locations in a facility coordinate system, the item identifiers and staged locations detected via a a client computing device by:

tracking a pose of the client computing device on a local coordinate system;

capturing one or more images of the items by a sensor of the client computing device; and rectifying the local coordinate system with the facility coordinate system;

obtaining a load configuration including (i) a load sequence defining an order in which the items in the staging area are to be loaded into a container, and (ii) a load location within the container for each of the items, in a container coordinate system;

according to the load sequence, for each item:

retrieving the corresponding staged location, in the facility coordinate system, and the corresponding load location, in the container coordinate system;

providing loading guidance including (i) the retrieved staged location in the facility coordinate system and (ii) the retrieved load location in the container coordinate system, for rendering of the loading guidance in one of the facility coordinate system and the container coordinate system;

rendering the loading guidance as an overlay on an output assembly depicting one of the facility coordinate system and the container coordinate system; and responsive to placement of the item in the container, receiving and storing an actual load location, in the container coordinate system; and during an unloading operation, presenting unloading guidance including the actual load locations of the items.

2. The method of claim 1, wherein the container is integrated with a vehicle.

3. The method of claim 1, wherein receiving the item identifiers and staged locations includes receiving item identifiers and staged locations from a client computing device including the sensor.

4. The method of claim 1, wherein presenting loading guidance includes sending the retrieved staged location and load location to a client computing device for rendering via an output assembly of the client computing device.

5. The method of claim 1, wherein obtaining the load configuration includes:

retrieving (i) an unload sequence defining an order in which the items are to be delivered, (ii) dimensions of each item, and (iii) dimensions of the container; and generating the load configuration based on the unload sequence, the item dimensions, and the container dimensions.

6. The method of claim 5, wherein generating the load configuration includes selecting the load sequence and the load locations to optimize volume utilization within the container.

7. The method of claim 5, wherein generating the load configuration includes selecting the load sequence and the load locations to optimize accessibility of the items during the unloading operation.

8. The method of claim 1, wherein presenting the unloading guidance includes:

receiving a request including an item identifier, from a second client computing device;

retrieving the corresponding actual load location of the item identifier; and providing the corresponding actual load location to the second client computing device.

9. The method of claim 1, wherein receiving the staged locations includes:

controlling the sensor to capture a sequence of images;

based on the images, (i) tracking a pose in the facility coordinate system, and (ii) identifying the items and determining the staged locations; and storing the staged locations in association with the item identifiers.

10. The method of claim 9, wherein presenting the loading guidance includes:

controlling an output assembly to render the staged location;

detecting, via the sensor, a predefined feature of the container;

registering the facility coordinate system to the container coordinate system;

transforming the load location to the facility coordinate system; and controlling output assembly to render the transformed load location.

11. A computing device, comprising:

a memory; and a controller configured to:

receive, for a plurality of items in a staging area, respective item identifiers and staged locations in a facility coordinate system, the item identifiers and staged locations detected via a a client computing device by:

tracking a pose of the client computing device on a local coordinate system;

capturing one or more images of the items by a sensor of the client computing device; and rectifying the local coordinate system with the facility coordinate system;

obtain a load configuration including (i) a load sequence defining an order in which the items in the staging area are to be loaded into a container, and (ii) a load location within the container for each of the items, in a container coordinate system;

according to the load sequence, for each item:

retrieve the corresponding staged location, in the facility coordinate system, and the corresponding load location, in the container coordinate system;

provide loading guidance including (i) the retrieved staged location in the facility coordinate system and (ii) the retrieved load location in the container coordinate system, for rendering of the loading guidance in one of the facility coordinate system and the container coordinate system;

render the loading guidance as an overlay on an output assembly depicting one of the facility coordinate system and the container coordinate system; and responsive to placement of the item in the container, receive and store an actual load location, in the container coordinate system; and during an unloading operation, present unloading guidance including the actual load locations of the items.

12. The computing device of claim 11, wherein the container is integrated with a vehicle.

13. The computing device of claim 11, wherein the controller is configured, to receive the item identifiers and staged locations, to receive the item identifiers and staged locations from a client computing device including the sensor.

14. The computing device of claim 11, wherein the controller is configured, to present loading guidance, to send the retrieved staged location and load location to a client computing device for rendering via an output assembly of the client computing device.

15. The computing device of claim 11, wherein the controller is configured, to obtain the load configuration, to:

retrieve (i) an unload sequence defining an order in which the items are to be delivered, (ii) dimensions of each item, and (iii) dimensions of the container; and generate the load configuration based on the unload sequence, the item dimensions, and the container dimensions.

16. The computing device of claim 15, wherein the controller is configured, to generate the load configuration, to select the load sequence and the load locations to optimize volume utilization within the container.

17. The computing device of claim 15, wherein the controller is configured, to generate the load configuration, to select the load sequence and the load locations to optimize accessibility of the items during the unloading operation.

18. The computing device of claim 11, wherein the controller is configured, to present the unloading guidance, to:

receive a request including an item identifier, from a second client computing device;

retrieve the corresponding actual load location of the item identifier; and provide the corresponding actual load location to the second client computing device.

19. The computing device of claim 11, wherein the controller is configured, to receive the staged locations, to:

control the sensor to capture a sequence of images;

based on the images, (i) track a pose in the facility coordinate system, and (ii) identify the items and determining the staged locations; and store the staged locations in association with the item identifiers.

20. The computing device of claim 19, wherein the controller is configured, to present the loading guidance, to:

control an output assembly to render the staged location;

detect, via the sensor, a predefined feature of the container;

register the facility coordinate system to the container coordinate system;

transform the load location to the facility coordinate system; and control output assembly to render the transformed load location.

* * * * *